Oct. 9, 1962
HANS-ERICH RODER
3,057,988
WELDING ELECTRODE FOR WELDING SHAPED
ARTICLES OF THERMOPLASTIC MATERIAL
Filed April 3, 1961
2 Sheets-Sheet 1
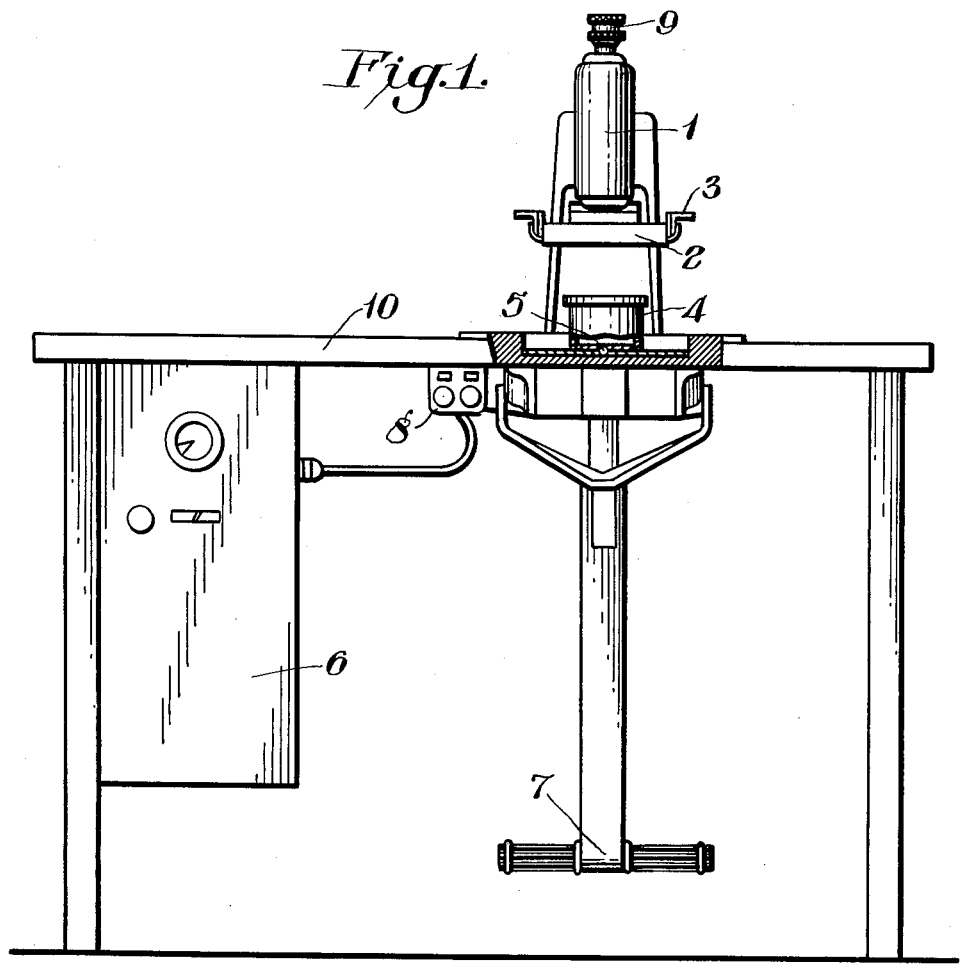
INVENTOR
Hans Erich Roder
BY Connolly and Hutz
ATTORNEYS

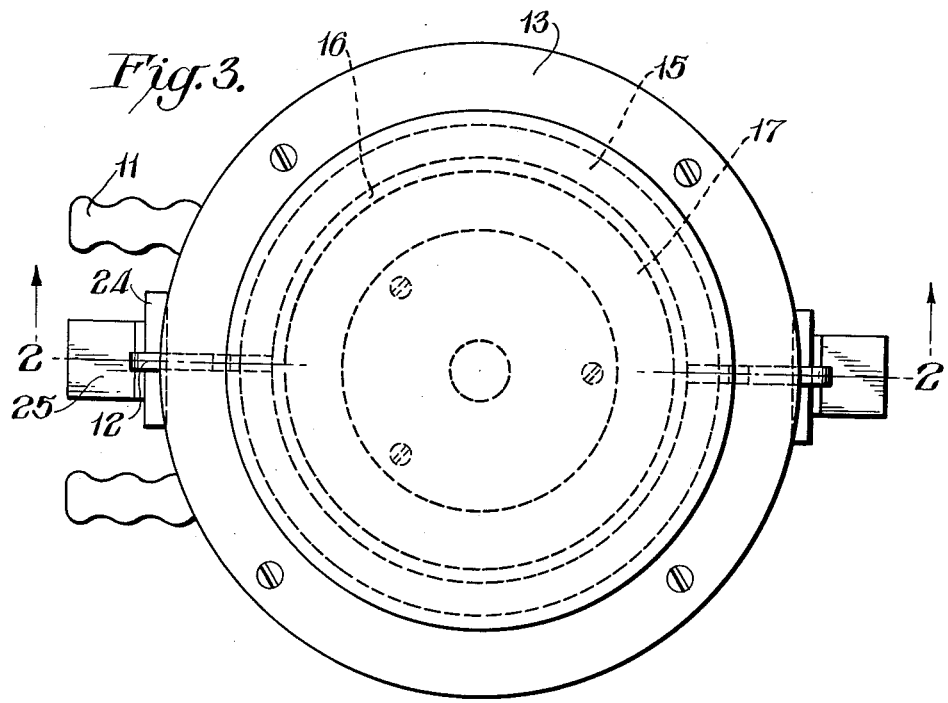
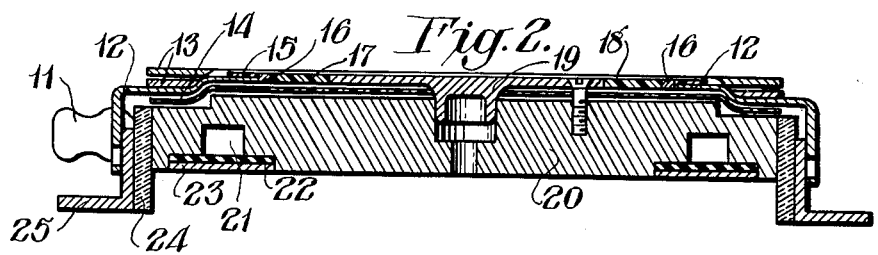
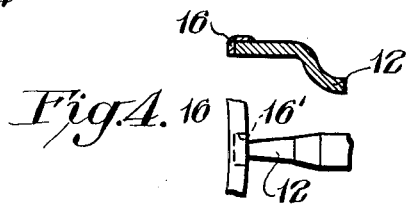

United States Patent Office 3,057,988
Patented Oct. 9, 1962

3,057,988
WELDING ELECTRODE FOR WELDING SHAPED ARTICLES OF THERMOPLASTIC MATERIAL
Hans-Erich Roder, Frankfurt am Main, Germany, assignor to Farbwerke Hoechst Aktiengesellschaft vormals Meister Lucius & Brüning, Frankfurt am Main, Germany, a corporation of Germany
Filed Apr. 3, 1961, Ser. No. 100,145
Claims priority, application Germany Aug. 18, 1960
3 Claims. (Cl. 219—19)

The present invention relates to a device for welding thick-walled sheets and shaped articles of thermoplastic materials, for example cans for food.

Several processes are known for the welding of thick-walled sheets and shaped articles of thermoplastic materials. However, all these processes are not suited for a fully automatic welding apparatus required, for example, in the canning industries for the large-scale production of thermoplastic cans.

In the devices operating according to the heated wedge welding process, a resistance-heated metal wedge moves between the layers to be welded plasticizing the opposite surfaces, which wedge is followed by a moving pressure roll that presses the seam together. However, for a fully automatic production with a large output as it must be guaranteed in the case of mass goods, for example cans, the expenditure for the construction of these devices is too high. After all, in the case of an automatic welding, the heated wedge must be automatically applied after the can has been placed in position, and there is required, moreover, a pivoting device for the can and the cover or, in the case of a stationary can, an operating mechanism for the heated wedge. In the case of polygonal cans or cans having a different shape, the process is even more complicated. For these reasons, devices for welding cans that operate according to this process have not been successfully applied in practice up to now.

When working according to the so-called butt welding process, the can and the cover, for example, are placed in the device, then the cover is lifted, for example, by a vacuum device, so that there is a space of a few centimeters between the can and the cover. A permanently heated electrode is swung on between the can and the cover and the rims of the can and the cover to be welded are brought into contact with the heating electrode. The electrode is swung out and the can and the cover are pressed together by means of compressed air in a manner such that the plasticized rims are welded thereby. Also when using a device that operates according to this principle, a relatively high expenditure for apparatus is necessary with a view to fully automatic welding.

In the case of the so-called heat-contact welding process, the can and the cover, for example, are placed in a holding means which is adapted to the shape of the plastics can, and a permanently heated electrode is applied under pressure to the rim of the cover to be welded. As soon as the rims of the can and the cover are plasticized and welded together, the electrode is removed.

This process can be carried out in a simple and rapid manner but it has the considerable drawback that, in the course of plasticizing the seam, the soft, plasticized material is squeezed out of the seam by the pressure of the permanently heated electrode support. The highly rigid and durable joints that are obtained when working according to the thermal impulse welding process by cooling the seam under pressure, which process has been described hereafter, cannot be obtained when working according to the thermal contact process.

In contrast to the afore-described process, it is much easier to carry out the so-called thermal impulse (current impulse) welding process. According to this process, for example, a can provided with a cover is placed in a holding means, the electrode of the welding device is pressed upon the cover by means of a pedal switch and the current impulse is released simultaneously. Since this process, without special expenditure for apparatus, can also be adapted to automatic operation, it is well suited for welding cans in mass production provided that a welding device with a satisfactory operating electrode is available.

Although such welding apparatus with straight electrodes for the welding of thin sheets are known, they consist exclusively of simple heater bands which, with an intermediate insulating layer, for example a fabric of glass fibers coated with polytetrafluorethylene, are fitted to the heater band which is fixed on the piston of the welding apparatus.

Recently there have also been developed electrodes for welding polygonal or round cans of thermoplastic materials according to the thermal impulse welding process. The devices operating according to this principle consist mainly of a welding electrode (heater band) fitted on an electrode support, a holding means for the object to be welded, a piston and a current impulse generator. As electrode material there is especially used a copper sheet having a thickness of about 200 to 300 microns. Since, however, in the welding of cans, for example cans for sterilizable food, there are mostly jointed relatively thick-walled covers having a wall thickness of about 0.2 to 2.0 mm. with thick-walled cans having a wall thickness of about 1 to 3 mm., very high electrode temperatures have to be applied in order to obtain the necessary welding temperatures for the contact surfaces to be jointed. For example, for welding a can having a wall thickness of 1 mm. with a cover having a wall thickness of 0.2 mm., made of linear polyethylene (low-pressure polyethylene), a welding temperature of about 180° to 220° C. is required which necessitates an electrode temperature of about 600° C. Such high temperatures in these thin electrode sheets often have the consequence that the sheets burn through or warp after a few weldings. Altho the piston on which the heater band is fitted exerts a pressure during the welding process (usually between 20 and 200 kilos), the warping of the heater band, which manifests itself in waviness, cannot be compensated to such a degree that the evenness of the welding seam is not affected. At least in the case of materials that can be welded with difficulty only such, for example, as linear polyethylene, there is formed an uneven welding seam in such a manner that separate areas of the seam may be unwelded, which effect cannot be overcome by altering the welding conditions, for example pressure, temperature and time.

The object of the present invention is a device for welding sheets or shaped articles such, for example, as cans for sterilizable food having a thickness ranging from about 0.2 to about 3 mm., made of thermoplastic materials, preferably polyolefins, said device operating according to the principle of the thermal (current) impulse welding process and consisting mainly of a welding electrode fitted on an electrode support, a holding means opposite to the welding electrode for the one part of the object to be welded, a piston for pressing the electrode upon the welding surface and a current impulse generator. The device according to the invention is characterized in that the welding electrode consists of a metal or an alloy having a specific electric resistance of about $5 \cdot 10^{-6}$ up to about $15 \cdot 10^{-6} \Omega$ cm. and a modulus of elasticity of about 16,000 up to about 21,000 kg./cm.$^2$, and has rounded-off edges, that the electrode support is provided with a cooling duct for cooling the welding electrode between the individual current impulses, that the current supplies to the welding electrode are fitted such that the electrode surface opposite to the plastics material to be welded is completely smooth and not interrupted by the current supplies, and that the holding means for the one part of the object to be welded is revolved on a ball joint (pivotally mounted).

As material for the proposed welding electrode there have proved to be advantageous, according to the invention, especially iron (specific electric resistance $8.6 \cdot 10^{-6}\Omega$ cm., elasticity modulus 21,000 ke./cm.²), nickel (specific electric resistance $6.1 \cdot 10^{-6}\Omega$ cm., elasticity modulus 21,000 ke./cm.²) and various steels provided that the specific electric resistance and elasticity modulus thereof, which are dependent on the respective composition, are situated within the claimed range.

The proposed welding device with the new welding electrode must be regarded as novel and unexpected inasmuch as it had to be assumed according to present knowledge that only very thin electrodes of metals having specific electric resistances that are as low as possible and a correspondingly good coefficient of heat transmission and thermal conductivity are suited for the heat impulse welding. For this reason, very thin and relatively broad bands of copper, silvered copper or silver-plated copper were used up to now as electrodes in the known thermal impulse welding devices which bands, however, showed—on account of the very high working temperatures required—the above-mentioned deficiencies when layers of plastics materials were welded that had a thickness exceeding about 0.2 mm.

The use of the proposed metals that have a relatively high specific electric resistance permits of constructing a welding electrode that has a much higher thickness while having the same total resistance. The thickness of the welding electrode ranges preferably from 0.5 to 5 mm., preferably 1 to 3 mm. The exact dimension depends, of course, on the shape and the length of the electrode. The working temperatures required for the different thicknesses of the sheets or shaped bodies can be adjusted without difficulties by a corresponding regulation of the current intensity. Since, moreover, the metals proposed are very hard and have a high flexural stiffness due to their high elasticity modulus, the welding electrodes made thereof do not warp even in the case of very high working temperatures (up to 600° C. when welding linear polyethylene having a high density) and do not burn through on account of their high melting temperature even when subjected to permanent power loads in the production line.

The poorer thermal conductivity and the lower coefficient for heat transmission of the proposed metals as compared with copper can easily be compensated by applying a somewhat higher current intensity resulting in a higher electrode temperature. The heat transfer can, moreover, be improved, for example, by galvanizing or depositing by evaporation layers that have a higher coefficient for heat transmission. It was found, however, that these methods, as a rule, are not necessary when the current impulse generator supplies a sufficiently high current intensity.

When working with the high electrode temperatures required and the high current intension necessitated thereby (currents having several 100 amperes may occur), it is necessary to cool the welding electrode between the individual current impulses since otherwise, after several weldings, the permanent temperature in the electrode support becomes so high that the welding electrode no longer cools off between the individual current impulses whereby the advantage of the thermal impulse welding process, in comparison with the thermal contact welding process, would be lost. In the device according to the invention, a sufficient cooling of the welding electrode is brought about by installing in the electrode support a cooling duct having a large flow cross-section and passing through cooling water when the device is in operation. Aluminum, on account of its high thermal conductivity, was found to be an especially suitable material for the electrode support.

Moreover, it was found to be advantageous when the current supplies to the welding electrode have a relatively large cross-section since otherwise, owing to the poor thermal conductivity at the position at which the current supplies are fitted on the welding electrode, an accumulation of heat occurs that brings about an overheating of the welding electrode at these positions which, of course, impairs the welding seam and can become so strong that the current supplies starting melting. It has, therefore, proved to be advantageous to use a material for the current supplies the thermal conductivity of which is by 0.1 to 0.3 cal./cm. sec. degree centigrade higher than that of the material of the welding electrode and to fit the current supplies on the welding electrode in a manner such that the surface of the welding electrode opposite to the plastics material to be welded is not interrupted by the current supplies.

Since the thermal conductivity of the metals that are suited for the welding electrode is situated within the range of about 0.09 to 0.16 cal./sec. cm. degrees centigrade (Fe 0.16, Ni 0.14, steels within the range of about 0.09 to 0.12 cal./cm. sec. degrees centigrade), the various commercial types of brass (thermal conductivity within the range of 0.19 to 0.26 cal./cm. sec. degrees centigrade) were found to be especially suitable for the fabrication of the current supplies. Copper with its considerably higher thermal conductivity is less suited because it dissipates too much heat so that at the position where the current supplies are fitted on the electrode, the electrode does not transmit sufficient heat to the seam to be welded so that flaws in the welding seam occur.

It is also necessary, in order to avoid an inhomogeneous distribution of the temperature in the welding electrode, to fit the current supplies on the welding electrode in such a manner that the surface of the welding electrode that is opposite to the plastics material to be welded is not interrupted by the current supplies. It has proved to be very advantageous to solder in a brass electrode in a manner such that the electrode material constitutes 25 to 50 percent and the current supplies that were soldered in constitute 50 to 75 percent of the total thickness of the welding electrode.

It was found that a special difficulty presents itself when welding thermoplastic materials according to the thermal contact welding process or the thermal impulse welding process due to the formation of weak spots at the borders of the welding seam. These weak spots are partly caused by the fact that the plasticized plastics material is squeezed out of the welding seam at both sides due to the pressure of the piston (welding pressure). Owing to this pressure, the seam becomes somewhat thinner and thus mechanically less resistant while the borders of the seam undergo a further reduction with respect to their mechanical resistance which seems to be due, among others, to a certain degradation of the plastics material and to internal mechanical tensions. According to experience, welding seams, in the case of a good welding, do not burst in the seam but beside the seam under strong mechanical stress. This effect can be checked by reducing the temperature of the welding electrode (reduction of the flowability of the melt of the plastics material) and reduction of the welding pressure of 1 to 20 kilos, but it cannot be avoided altogether. It was found that this effect can be reduced to an insignificant value by rounding off the edges of the welding electrode and embedding the electrode between two parts of polytetrafluorethylene in a manner such that the welding electrode projects by about 5 to 50 percent of its thickness beyond these limiting parts, while the last-mentioned measurement depends especially on the softness and the flowability of the material to be welded at the respective welding temperature applied. Owing to this method, the welding electrode cannot penetrate into the layer of the plastics material to be welded beyond a certain extent when the welding pressure is too high which pressure, between 1 and 20 kilos, can be adjusted precisely with high technical expenditure only. Thus a small quantity of plastics material is displaced only and the diminution in the mechanical resistance of the borders of the welding seam is reduced to a very low, practically negligible value.

According to experience, there easily occur canting phenomena when welding thick-walled shaped articles and sheets, which phenomena manifest themselves, for example, in that one half of the circumference of a cover on a round plastics can is welded satisfactorily while the welding seam of the other half is not closed. This flaw is due to the fact that the welding electrode on the one side and the holding means opposite to the welding electrode on the other side often form a small angle with one another so that no uniform surface pressure (welding pressure) is applied to the two surfaces to be welded so that an uneven welding seam is formed. These flaws are caused already by very slight canting phenomena (for example of a few centimillimeters).

When operating with the welding device according to the present invention, this flaw is avoided by revolving the holding means on a ball joint, whereby the surfaces of the parts to be welded adjust themselves—when subjected to the pressure of the piston—by means of the ball joint in a manner such that the welding surfaces are evenly superimposed one on the other at any part so that an entirely even welding pressure is guaranteed along the entire welding seam.

In a suitable form of the welding device according to the present invention the holding means is additionally provided with a permanently heated electrode of the same construction as the opposite welding electrode that operates according to the thermal impulse welding process, the welding surface of the one plastics part to be welded that is fitted in the holding means lying tightly against said permanently heated electrode.

This construction has proved especially advantageous when the part of plastics material that is placed in the holding means has a thickness of a few millimeters at the intended welding surface since in this case it may be necessary to preheat the respective welding surface of this part in order to obtain a satisfactory welding seam.

The maximum thickness of a sheet that can still be welded with the device according to the invention depends, of course, primarily on the melting temperature, the melting index and the general flow properties of the material used in each case. For example, polyethylene having a density of 0.92 can be welded more easily than linear polyethylene having a density of 0.96, and this polyethylene, in its turn, can be welded more easily than polypropylene. In the case of an easily flowing material, sheets or shaped bodies having a thickness of 3 mm. can still be welded while in the case of polypropylene the limit lies at about 1.5 mm. These statements of thickness only refer to the upper layer of the plastics material situated directly under the current impulse welding electrode. Since the lower layer of the part of plastics material placed in the holding means has only to be melted to such a degree as is sufficient for the welding, it is not necessary to plasticize that lower layer completely. The thickness of this lower layer is therefore not limited and depends only on the required purpose. For example, when constructing a can which is to be welded with a cover by means of the device according to the invention, the walls of the can may have any thickness desired; only the dimensions of the cover must remain within certain limits.

If, however, the two layers of plastics material of the two parts of plastics material to be welded together have a thickness of more than 2 mm., a special construction of the welding device has proved to be very advantageous in which, according to the invention, a second welding electrode is mounted on the holding means which welding electrode is of the same construction as the welding electrode opposite to it which is mounted on the electrode support and is heated also by the thermal impulse process by means of the current impulse generator, the welding surface of the plastics part placed in the holding means lying tightly against this second welding electrode.

With this modification of the invention, an entirely uniform heating of the two layers of plastics material to be welded one with the other is obtained.

Sheets or shaped articles having a thickness below 0.2 mm. can, of course, also be welded with the aid of the device according to the invention; however, when working with this device no advantages are derived in the case of such thin sheets exept a much greater durability of the electrode since these sheets can also be welded with the known welding devices provided, for example, with copper electrodes.

The device according to the present invention can be used with special advantage for the welding of sheets and shaped articles made of polyolefins such, for example, as polyethylene and polypropylene since, due to the high softening temperatures of said polyolefins, very high welding electrode temperatures have to be applied. As described above, the known welding electrodes of copper sheets cannot resist these high temperatures which provoke buckling phenomena of the electrode. Moreover, due to the non-polar character of these plastics materials, it is not possible to carry out a high-frequency welding, and hitherto no devices are known by means of which parts can be welded satisfactorily whose thickness of layer exceeds 0.2 mm. In the case of a corresponding adjustment of the current intensity, the proposed device can, of course, also be used for welding the other thermoplastics.

The form of the welding electrode in the device according to the invention depends in each case on the required purpose. When using closed circular or polygonal welding electrodes, round or polygonal cans and covers can be welded with special advantage by means of the device according to the invention. It is also possible to provide this device with electrode grids for welding shaped articles that were vacuum-formed from multicavity molds, which is of great technical importance for the canning industries with highly automatic operation. However, the device according to the invention is also very well suited for welding sheets, fabrics or sieves when using round, polygonal or rod-shaped (linear-shaped) welding electrodes.

One form of a welding device constructed in accordance with the present invention which is especially suitable for the welding of round cans with a round cover of thermoplastic materials is illustrated, by way of example only, in FIGS. 1 to 4 of the accompanying drawings, in which FIG. 1 represents a diagrammatic view of the complete welding device with its essential parts, FIG. 2 represents a longitudinal section through the electrode support with the welding electrode, FIG. 3 shows the electrode support with the welding electrode (as shown in FIG. 2) in plan elevation, and FIG. 4 shows an enlarged view of section A of FIG. 2 in plan and end elevation.

In FIG. 1 are: 1 the piston, 2 the electrode support with the welding electrode, 3 the current supply connector, 4 the holding means for the plastic can opposite to the welding electrode, 5 the ball joint on which the holding means 4 is pivoted, and 6 the impulse generator. The device is furthermore equipped with a foot pedal 7, by means of which pedal and piston 1 the electrode support 2 with the welding electrode is pressed upon the cover laid upon the plastics can in order to produce the necessary welding pressure, whereby the circuit is closed simultaneously. Furthermore, 8 denotes the switch for switching the welding apparatus on and off and 9 an adjusting screw for adjusting the depth of impression of the welding electrode. The complete welding device is mounted on a table 10.

FIGURES 2 to 4 show the special construction of the electrode support 2 with the welding electrode. In FIGS. 2 to 4 are: 11 the supply for the cooling water for the cooling duct 21 in the electrode support 20, 12 the current supply for the annular welding electrode 16, slots 16' in the electrode for receiving the current supply leads 12, FIG. 4, 13 ring-shaped fasteners, for example of aluminum, for the current supply 12 and the insulating sheet 18, 14 an insulating sheet of polytetrafluorethylene for insulating the electrode support 20 from the welding electrode 16, 15 and 17 rings of solid polytetrafluorethylene for fastening the welding electrode 16, 16 the annular welding electrode, 18 an insulating sheet of a fabric of glass fibers coated with polytetrafluorethylene superimposed on the welding electrode 16 in order to inhibit adhesion phenomena, 19 a fastening cover with a spigot, for example of aluminum, 20 the solid electrode support, 21 the cooling duct, 22 the packing of the cooling duct made, for example, of rubber, 23 the cover of the cooling duct, 24 an insulating member (plate of pressed materials), and 25 a copper angle piece for fastening the cable from the impulse sender.

However, the special construction of the welding device according to the invention as illustrated, by way of example, in FIGS. 1 to 4 of the accompanying drawings does not constitute a limitation of the present invention, especially with respect to the shape of the welding electrode. As mentioned already, especially the welding electrode of the device according to the invention may have a shape other than that shown in FIGS. 2 and 3; it may, for example, be polygonal for welding polygonal plastics cans with a correspondingly shaped plastics cover, or it may be rod-shaped for welding sheets which, of course, necessitates a different shape of the electrode support and the holding means that have to be adapted to the welding electrode.

The following example serves to illustrate the invention but it is not intended to limit it thereto:

*Example*

Round cans of linear polyethylene (density: 0.95, crystallite melting point 127° to 132° C.) with an internal diameter of 98 mm., a wall thickness of 1.5 mm. and a welding rim of 6 mm. width and 1.5 mm. thickness were welded with covers of the same material having welding rims of 6 mm. width and 0.5 or 1.0 mm. thickness respectively by means of the device shown in FIGS. 1 to 4. The width of the welding seam was 3 mm.

The welding electrode of the device used was made of steel (St 33, German Industrial Standards 17, 100), with an external diameter of 110 mm., a width of 3 mm. and a thickness of 2 mm. The current supplies for the welding electrode were made of brass (MS 63: German Industrial Standards 17, 660). They had a width of 6 mm. and a thickness of 1.5 mm. and were, for thermic reasons, tapered to a width of 3 mm. (cf. FIG. 4) before the positions at which they were installed on the electrode ring. In order to weld each thermoplastic container, a current impulse of from 7 to 10 seconds' duration at a potential of 4 volts obtained from the secondary coil of a transformer and a current intensity of from 50 to 1000 amperes was passed through the electrode which heated the electrode sufficiently to weld the cover of the container to the rim of the container.

In all cases there were obtained satisfactory welding seams that were not damaged by the subsequent sterilization of the cans. In storage tests over a period of 8 months, it was found that the cans filled with various meats and fats were impermeable to bacteria. Welded cans filled with water withstood several drops from a height of 2 meters without damage to the welding seams.

I claim:

1. A ring-shaped welding electrode for sealing shaped articles consisting of thermoplastic materials and having a wall thickness within the range of about 0.2 to about 3 mm. according to the thermal impulse welding method, said electrode consisting of a metallic material that has a specific electrical resistance within the range of $5 \times 10^{-6}$ to $15 \times 10^{-6}$ ohms centimeters and an elasticity modulus within the range of 16,000 to 21,000 kilograms per square centimeter, current supply leads consisting of a metallic material that has a thermal conductivity which is 0.1 to 0.3 cal. centimeter$^{-1}$ × degree centigrade$^{-1}$ × second$^{-1}$ larger than the thermal conductivity of the material of the electrode, and slots in the lower portion of the electrode for accommodating the current supply leads to connect the leads with the electrode whereby the electrode surface facing the plastic material to be welded is uninterrupted.

2. Welding electrode as claimed in claim 1, wherein the current supply leads consist of brass.

3. Welding electrode as claimed in claim 1, wherein 25 to 50% of the total thickness of the welding electrode consists of electrode material and 75 to 50% of the total thickness consists of the material of the supply leads at said electrode slot-current supply lead connection.

References Cited in the file of this patent

UNITED STATES PATENTS

| | | |
|---|---|---|
| 2,014,332 | Houlette | Sept. 10, 1935 |
| 2,582,581 | Bona | Jan. 12, 1952 |
| 2,714,416 | Fener | Aug. 2, 1955 |
| 2,834,395 | Russell et al. | May 13, 1958 |